(12) United States Patent
Montaigne et al.

(10) Patent No.: US 9,870,645 B2
(45) Date of Patent: Jan. 16, 2018

(54) AUGMENTED REALITY METHOD AND SYSTEM FOR MEASURING AND/OR MANUFACTURING

(71) Applicant: Accenture Global Services Limited, Dublin (IE)

(72) Inventors: Manuel Montaigne, La Salvetat-Saint-Gilles (FR); Teemu Rossi, Dublin (IE)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 13 days.

(21) Appl. No.: 15/170,716

(22) Filed: Jun. 1, 2016

(65) Prior Publication Data

US 2016/0364913 A1  Dec. 15, 2016

(30) Foreign Application Priority Data

Jun. 12, 2015 (EP) .................................... 15290157

(51) Int. Cl.
| | | |
|---|---|---|
| *G06T 19/00* | (2011.01) | |
| *G06T 7/00* | (2017.01) | |
| *G01C 3/08* | (2006.01) | |
| *G05B 19/418* | (2006.01) | |
| *G06F 3/01* | (2006.01) | |

(52) U.S. Cl.
CPC .............. *G06T 19/006* (2013.01); *G01C 3/08* (2013.01); *G05B 19/41805* (2013.01); *G06F 3/014* (2013.01); *G05B 2219/32014* (2013.01); *G05B 2219/36167* (2013.01); *G05B 2219/39449* (2013.01); *Y02P 90/04* (2015.11)

(58) Field of Classification Search
CPC ......... G06F 3/014; G01C 3/08; G06T 19/006; G05B 19/41805; G05B 2219/32014; G05B 2219/36167; G05B 2219/39449; Y02P 90/04
See application file for complete search history.

(56) References Cited

U.S. PATENT DOCUMENTS

| | | | | |
|---|---|---|---|---|
| 6,081,273 A | * | 6/2000 | Weng .................. | G06T 7/85 345/420 |
| 6,483,948 B1 | * | 11/2002 | Spink .................. | G02B 21/22 345/424 |

(Continued)

FOREIGN PATENT DOCUMENTS

JP         2014229057         12/2014

OTHER PUBLICATIONS

European Search Report dated Dec. 21, 2015, European Patent Application No. 15290157.5-1807 filed Jun. 12, 2015, European Patent Office.

(Continued)

*Primary Examiner* — Sang Nguyen
(74) *Attorney, Agent, or Firm* — Mannava & Kang, P.C.

(57) ABSTRACT

An assembling method, an augmented reality system and a computer program product for measuring and/or manufacturing are provided. A targeting object may be placed in a working space. A distance is measured from the measurement device to the targeting object. The distance measurement is transmitted to the augmented reality system, and the augmented reality system determines whether the distance measurement corresponds to a target distance.

15 Claims, 9 Drawing Sheets

(56) References Cited

U.S. PATENT DOCUMENTS

| | | | |
|---|---|---|---|
| 2005/0149231 A1* | 7/2005 | Pretlove | B25J 9/1671 |
| | | | 700/264 |
| 2012/0007852 A1 | 1/2012 | Morate et al. | |
| 2012/0047233 A1* | 2/2012 | Jin | G06T 11/00 |
| | | | 709/219 |
| 2013/0278635 A1* | 10/2013 | Maggiore | G06T 19/006 |
| | | | 345/633 |
| 2013/0345491 A1* | 12/2013 | Saitoh | A61B 5/0042 |
| | | | 600/9 |
| 2014/0022281 A1* | 1/2014 | Georgeson | G06F 3/1454 |
| | | | 345/633 |
| 2014/0126724 A1* | 5/2014 | Kurabayashi | G06T 19/006 |
| | | | 381/17 |
| 2014/0156219 A1* | 6/2014 | Soubra | G01C 15/00 |
| | | | 702/150 |
| 2014/0327666 A1* | 11/2014 | Suzuki | G06T 19/006 |
| | | | 345/419 |
| 2014/0354690 A1* | 12/2014 | Walters | H04W 4/04 |
| | | | 345/633 |
| 2014/0375816 A1* | 12/2014 | Maihoefer | G01C 21/365 |
| | | | 348/148 |
| 2015/0161476 A1* | 6/2015 | Kurz | G06K 9/4671 |
| | | | 382/190 |

OTHER PUBLICATIONS

Handerson, et al., "Augmented Reality in the Psychomotor Phase of a Procedural Task", IEEE International Symposium on Mixed and Augmented Reality 2011 Science and Technology Proceedings, Oct. 26-29, 2011, pp. 191-200, Basel, Switzerland.

* cited by examiner

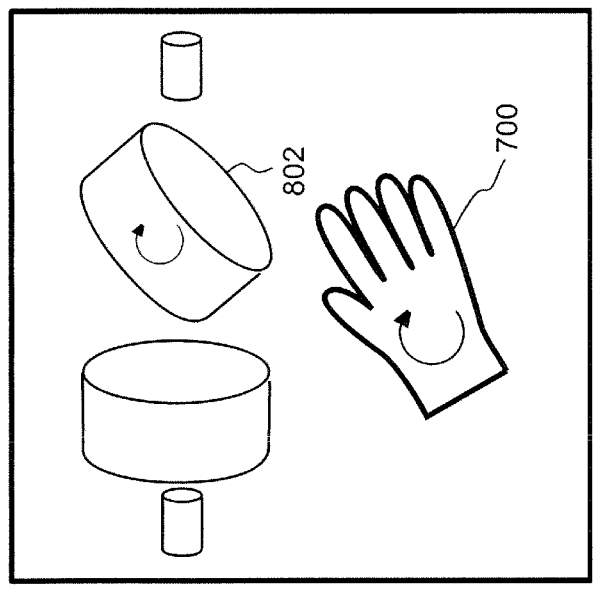
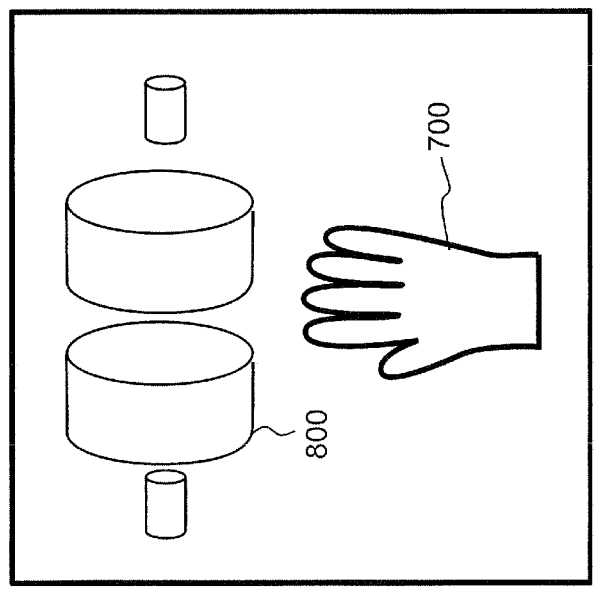
FIG 8

AUGMENTED REALITY METHOD AND SYSTEM FOR MEASURING AND/OR MANUFACTURING

PRIORITY

The present application claims priority under 35 U.S.C. 119(a)-(d) to European patent application number 15290157.5, having a filing date of Jun. 12, 2015, the disclosure of which is hereby incorporated by reference in its entirety.

The technical field of the present application is measuring and/or manufacturing with the assistance of an augmented reality system. More specifically, aspects of the application relate to an assembling method for measuring or manufacturing a vehicle, such as an aircraft. Further aspects relate to a computer program product that performs operations according to the method and an augmented reality system for measuring and/or manufacturing.

Conventionally, determining points of attachment in a vehicle is a complex and error-prone process. In the specific case of an aircraft, a number of variables can affect the locations of points of attachment for objects to be fixed within the aircraft, such as seats. Accordingly, determining exactly where seats should be attached within the fuselage of an aircraft is a complex, labor intensive, time consuming and error-prone process.

The following variables may affect the seat layout and points of attachment for seats in an aircraft: the type of aircraft, the company for whom the aircraft is built, the purpose for which the aircraft is built, the type of seats being used, and the location of the seats within the aircraft.

Each type of aircraft may have a different seat layout and/or may use different types of seats. The seat layout may affect the location of aisles, the distance between rows, and the number of travel classes. Further, each airline/company (e.g. Lufthansa or United Airlines) may require a different seat layout for the same type of aircraft, such that two aircraft of the same type that are being built for different airlines have different seat layouts and/or may use different types of seats. The purpose of the aircraft, e.g. which flights the aircraft was purchased for or which customers are targeted, may also affect the seat layout, such that even the same type of aircraft and the same airline may have different seat layouts. In addition, within the same aircraft, the space between seats may vary depending on the location of the seats within the aircraft. For example, seats near an exit door, stairs or a toilet may be spaced differently (i.e. the seats may have a different spatial distance between them). In addition, seats in a first class section of an aircraft may be of different types and have a different amount of space between them in comparison to seats in a business section of the aircraft or an economy class section of the aircraft. Different floors within the aircraft may also have an effect on the spacing between seats.

Conventionally, an assembling method is performed by a trained technician according to complex documents. Returning to the specific example of an aircraft, seats within the aircraft are placed by a trained technician (i.e. user) according to detailed documents. In some cases, the documents provide a set of machine readable codes (e.g. barcodes), the codes are scanned and detailed information regarding the seating layout is displayed for the user, e.g. on an electronic display. Generally, slotted rails are fixed to the floor of the fuselage of the aircraft and function as attachment areas for the seats. The documents specify the seating layout for the aircraft, as discussed above, and provide the means to calculate the measurements to determine each point of attachment along each rail. The point of attachment may be located at a slot on the rail.

The documents may provide units of measure in inches and feet while the measuring tools provided to the technician generally measure in centimeters. The mix of units increases the risk of errors.

Further, the documents are generally provided for a fully assembled aircraft, whereas the technician might only be working on a section of the aircraft (e.g. one section out of three in total). Thus, the technician may have to perform further calculations to determine a starting point for measurement depending on the aircraft section being assembled.

Accordingly, the technician calculates the location of each point of attachment using the documents, performs measurements (e.g. using a tape measure) and then places marks (e.g. uses a black felt pen to make a visible mark) along the rails to indicate points of attachment. The technician often receives a new set of documents for each building project, e.g. each aircraft to be built, and thus, is often unable to become familiar with the intricacies of any particular seat layout. Thus, making all the necessary marks for all the points of attachment for every seat of an aircraft according to the conventional approach may take a technician many hours, e.g. about 15 hours.

Further, according to conventional techniques, the technician may require a significant amount of training to mark the points of attachment correctly according to the documents, e.g. about 3 months.

In addition, performing the assembling method using conventional techniques, e.g. locating and marking points of attachment in a vehicle, is an error prone process. Any error can significantly slow down production and raise costs. In particular, undetected errors made near the beginning of the assembling process can affect all further measurements and require the technician to start over from the beginning.

Further, according to conventional techniques, the assembling method is not ergonomic. A worker may need to kneel for the entire process.

Accordingly, it is a problem to perform an assembling method more efficiently (e.g. more quickly). In addition, it is a problem to reduce errors when performing the assembling method. Further, it is a problem to provide a technical tool to assist technicians in order to reduce required training time when performing the assembling method.

According to an aspect, an augmented reality assembling method for measuring and/or manufacturing is provided. The method comprises providing an augmented reality system including a receiver, a processor and an output device. The method further comprises providing a targeting object in a working space. The method further comprises determining a position as a determined position of the targeting object. The method also comprises determining, by the augmented reality system, whether the determined position of the targeting object corresponds to a target position. The method further comprises outputting information on at least one of the following via the augmented reality system: a location in the working space for the targeting object, such that when the targeting object is displaced to the outputted location a determined position of the targeting object will correspond to the target position and the distance measurement will correspond to the target distance.

The method also comprises arranging a measurement device in the working space such that the measurement device has a specified positional relationship to a reference point in the working space. Accordingly, the method further comprises measuring, by the measurement device, a distance measurement from the measurement device to the targeting object so as to enable the determination of the determined position of the targeting object by the augmented reality system. The method also comprises transmitting, by the measurement device, the distance measurement to the augmented reality system. On the outputting step the augmented reality system outputs at least one of the following: whether the distance measurement corresponds to the target distance, a location for the targeting object, such that when the targeting object is displaced to the outputted location the distance measurement will correspond to the target distance.

According to another aspect, an augmented reality system for measuring and/or manufacturing is provided. The system comprises a position determination module for determining a position as a determined position of a targeting object provided in a working space. The system further comprises a determination module for determining whether the determined position of the targeting object corresponds to a target position. The system further comprises an output module for outputting information on at least one of the following: a location for the targeting object, such that when the targeting object is displaced to the outputted location the determined position will correspond to the target position and the distance measurement will correspond to the target distance.

According to yet another aspect an augmented reality system for measuring and/or manufacturing is provided. The system depends on the system described immediately above. The system comprises a receiver capable of receiving a distance measurement from a measurement device located in a working space. The measurement device has a specified positional relationship to a reference point in the working space. The distance measurement is a distance from the measurement device to a targeting object located in the working space. The system further comprises a processor, which is communicatively connected to the receiver, and which is capable of determining whether the distance measurement corresponds to a target distance. The system further comprises an output device, which is communicatively connected to the processor, and which is capable of providing augmented reality information indicating one or more of the following: whether the distance received from the measurement device corresponds to the target distance; a location for the targeting object, such that when the targeting object is displaced to the indicated location the distance measurement will correspond to the target distance.

According to a particular aspect, an assembling method for measuring and/or manufacturing is provided. The assembling method may be carried out for a vehicle such as an aircraft. The method may comprise providing an augmented reality system including a receiver, a processor and an output device. The method may further comprise arranging a measurement device in a working space such that the measurement device has a specified positional relationship to a reference point in the working space. The specified positional relationship may be predetermined or predeterminable. The specified positional relationship may be predetermined in the sense that the relationship is determined before the measurement device is arranged in the working space. The specified positional relationship may be predeterminable or determinable in the sense that the relationship is determined after the measurement device is arranged in the working space.

In the example of an aircraft, the reference point may be a fixed datum selected by the aircraft manufacturer and placed on or attached to a rail. Each rail may have a reference point. For example, the reference point may be a marker or sticker attached or adhered to the rail. Distances to points of attachment may be specified from the reference point according to a particular seat layout.

The method may further comprise providing a targeting object in the working space. The method may also comprise measuring, by the measurement device, a distance measurement from the measurement device to the targeting object. The method may also comprise transmitting, by the measurement device, the distance measurement to the augmented reality system.

The method may further comprise determining, by the augmented reality system, whether the distance measurement corresponds to a target distance. The distance measurement may correspond to the target distance in the sense that a conversion may need to be performed, e.g. the target distance is specified (i.e. calculated) in units or inches and the distance measurement is measured in centimeters. Alternatively, determining whether the distance measurement corresponds to a target distance may be implemented by determining whether the distance measurement is equivalent/equal to a target distance.

In the context of the present application, the terms distance and length may be used interchangeably.

The method may further comprise indicating at least one of the following via the augmented reality system:
whether the distance measurement corresponds to the target distance,
a location for the targeting object, such that when the targeting object is displaced to the indicated location the distance measurement will correspond to the target distance.

Advantageously, by determining whether the distance measurement corresponds to the target distance, the augmented reality system makes the assembly method more efficient. In particular, it is no longer necessary for the user to consult complex documents to determine the target distance. Thus, the total time required to perform the assembling method may be reduced by a factor of 6 in comparison to conventional approaches.

Further, the risk of error is reduced via performance of the measuring step by the measurement device and by determining whether the targeting object is in the correct location via the augmented reality system. Eliminating errors may improve production since any error can cause a cascade of delays that may have further impacts beyond the resources required to correct the error.

Also, the fatigue and discomfort of the user during the performance of the assembling method are reduced, particularly because the method is faster and the user does not need to kneel for as much time, but also because the user may perform the method without kneeling in some cases.

Further, the training time required for the user to perform the assembling method is significantly reduced (e.g. from 3 months to around 10 minutes) particularly because the user no longer needs to read and understand various complex documents and because the augmented reality system, measurement device and targeting/calibrating object are easy to use. This may improve flexibility since inexperienced personnel can perform a task that used to require experienced personnel. The experienced personnel can perform other (e.g. more critical) tasks.

In some cases, the measurement device is capable of measuring a distance or length of at least 10 meters with at least millimeter accuracy (e.g. 1 millimeter accuracy, 2 millimeter accuracy or 5 millimeter accuracy). The measurement device may be a laser. Millimeter accuracy may also be referred to as millimeter level accuracy or millimeter resolution.

Further, the augmented reality system may include smart eyewear, e.g. smart glasses. The augmented reality system may be implemented via smart eyewear. The transmitting by the measurement device may be carried out wirelessly, e.g. via Bluetooth. Accordingly, the receiver may be a wireless receiver, particularly a Bluetooth receiver.

In some cases, the working space is inside a vehicle. In particular, the working space may be an aircraft fuselage.

Also, the working space may include at least one attachment area. The attachment area may be a seat rail or retention rail. The reference point may be located on the attachment area. In particular, the reference point may be a reference datum or sticker attached to the attachment area.

In some cases, the method may comprise showing, via the augmented reality system, an indication of points or locations in the working space for at least one of the following:
where the measurement device should be mounted or placed;
where a calibrating object should be placed;
where the targeting object should be placed.

At least one (or all) of the indicated points above may be overlaid on the working space or an image of the working space.

The augmented reality system may be capable of recognizing the targeting object and/or a point of attachment, e.g. via image recognition. In particular, the augmented reality system may include a camera. The augmented reality system may use the camera to perform image recognition.

Each indication provided via the augmented reality system may be shown on the output device.

The indication of where the targeting object should be placed may be shown when the distance measured by the measurement device is within a specified length from the target distance. For example, the indication may be shown when the measured distance is greater than the target distance and less than 120% (or 105%, 110%, 115% or 125%) of the target distance or the indication may be shown when the measured distance is less than the target distance and greater than 80% (or 75%, 85%, 90% or 95%) of the target distance. In particular, the indication may be shown when the specified length is 10 points of attachment (e.g. slots) or less.

When the specified positional relationship is not predetermined, arranging the measurement device in the working space may further comprise placing the measurement device in the working space. The measurement device is not necessarily placed in a precise location, but may be aligned with the reference point. In particular, the measurement device may be placed near an end (i.e. boundary or extremity) of an attachment area. In particular, the measurement device may be aligned with the reference point. Aligning the measurement device with the reference point may enable more efficient measurements. Further, the measurement device may be within 1 cm, 2 cm, 3 cm, 4 cm or 5 cm from an end (e.g. the beginning) of the attachment area. In some cases, the measurement device may be arranged between the beginning of the attachment area and the reference point.

The end of an attachment area may refer to a start of the attachment area. For example, the end of the attachment area may refer to a starting point of a rail.

Alternatively, the measurement device may be placed within a circle centered on a beginning/end of an attachment area. The circle may have a radius of 1 cm, 2 cm, 3 cm, 4 cm or 5 cm. In this case, measuring may be accomplished via triangulation.

In addition, arranging the measurement device in the working space may also include providing a calibrating object in the working space at the reference point. Accordingly, arranging the measurement device in the working space includes determining a calibration distance from the measurement device to the reference point via the calibrating object, and determining the specified positional relationship based on the calibration distance. In particular, the specified positional relationship may be the calibration distance.

When the specified positional relationship is predetermined arranging the measurement device in the working space further comprises placing the measurement device a specified distance from the reference point according to the specified positional relationship. Accordingly, when the specified positional relationship is predetermined, the measurement device may be precisely placed.

Accordingly, when the specified positional relationship is predetermined, the specified positional relationship may define a distance between the measurement device and the reference point. Thus, arranging the measurement device in the working space may involve ensuring that a length between the measurement device and the reference point is the distance defined by the specified positional relationship. Accordingly, the specified positional relationship may define the specified distance, i.e. the distance between the measurement device and the reference point.

Regardless of whether the specified positional relationship is predetermined, the specified positional relationship may be used to measure further distances, e.g. to the target object, via the measurement device.

In some cases, the targeting object and/or the calibrating object is a reflector. The targeting object and/or the calibrating object may be moveable. Further, the targeting object and the calibrating object may be the same object. The targeting object and/or the calibrating object may have a predetermined color. The predetermined color may be distinguishable from a color of the working space and a color of the attachment area. For example, the targeting/calibrating object may be red and blue in color, the attachment area may be beige in color and the working space may be gray in color. Various combinations are possible.

The augmented reality system may include an input device, e.g. a scanner. Accordingly, the method may further comprise receiving input at the input device and determining the target distance based on the input. The target distance may also be determined based on the specified positional relationship.

For example, the input may specify a marking distance from the reference point that can be used to calculate the target distance, e.g. the input may specify a marking distance as a number of centimeters from the reference point. Accordingly, if the input specifies a marking distance between the measurement device and the reference point, the target distance may be determined by subtracting the marking distance from the specified positional relationship (e.g. the calibration distance or the specified distance). Alternatively, the target distance may be determined by adding the marking distance to the specified positional relationship. Other calculations are also possible.

According to an example, a user is provided with a paper work order. The work order includes at least one optical machine-readable representation of data (e.g. a bar code for each operation to be performed by an operator). Each machine-readable representation may be used to look up an operation (e.g. in a database) or may specify the operation itself (e.g. at least one Quick Response code may specify the operation). Each operation may specify a location for a point of attachment, e.g. as a marking distance from the reference point.

When the augmented reality system determines that the distance measured by the measuring device does not correspond to (e.g. is not equivalent to) the target distance, the method may further comprise showing, by the augmented reality system, an indication of where to place the targeting object, such that after the targeting object is placed according to the indication, a distance measured by the measurement device will correspond to (e.g. be equivalent to) the target distance. The preceding showing step may be carried out when the distance measured by the measurement device is within a specified length from the target distance.

When the augmented reality system determines that the distance measured by the measuring device does not correspond to (e.g. is not equivalent to) the target distance, the method may further comprise showing, by the augmented reality system, an indication of a direction to move the targeting object, such that after the targeting object is moved in the indicated direction, a distance measured by the measurement device will be closer to the target distance. For example, the augmented reality system may display an arrow pointing toward the measurement device to indicate that the targeting object should be moved closer to the measurement device or an arrow pointing away from the measurement device to indicate that the targeting object should be moved further away from the measurement device. Different colors may be used depending on the direction to move the targeting object.

When the augmented reality system determines that the distance measurement does not correspond to (e.g. is not equivalent to) the target distance, the method may further comprise showing, by the augmented reality system, an indication of the difference between a distance from the targeting object to the measurement device and the target distance. For example, the augmented reality system may indicate that the targeting object should be moved a specified number of attachment points (e.g. −4 rail slots) closer to the measurement device. Alternatively, the augmented reality system may indicate that the targeting object should be moved a specified number of attachment points (e.g. +4 rail slots) further away from the measurement device. Each indication may be overlaid on the working space.

When the augmented reality system determines that the distance measured by the measuring device corresponds (e.g. is equivalent) to the target distance, the method may further comprise indicating, via the augmented reality system, a location in the working space at which a mark should be made in relation to the targeting object. The mark may indicate a point of attachment on an attachment area in the working space.

The following may be performed as part of a validation process in order to verify that points of attachment have been correctly marked. After a mark has been made at the indicated location and the targeting object has been removed, the method may further comprise providing the targeting object at the location of the mark. In addition, the method may comprise measuring, by the measurement device, a distance measurement from the measurement device to the targeting object. Further, the method may comprise validating whether the distance measurement corresponds (e.g. is equivalent) to the target distance. Moreover, the method may comprise indicating a result based on the validation.

For example, a positive result may be indicated if the mark is in the correct position. Alternatively, a negative result may be indicated if the mark is in the incorrect position and should be shifted a specified distance.

Moreover, performance of the validation process has the advantage of further reducing the risk of error such that it is practically nonexistent, thereby significantly improving production efficiency when performing the assembling method. As noted above, eliminating errors may improve production since any error can cause a cascade of delays that may have further impacts beyond the resources required to correct the error.

According to another aspect, the methods described above may be implemented via a computer program product comprising computer-readable instructions, which, when loaded and executed on a computer system, cause the computer system to perform the above-described operations.

According to yet another aspect, an augmented reality system for measuring and/or manufacturing may be provided. The system may comprise a receiver capable of receiving a distance measurement from a measurement device located in a working space. The measurement device may have a specified positional relationship to a reference point in the working space. The distance measurement may be a distance from the measurement device to a targeting object located in the working space.

The system may further comprise a processor, which is communicatively connected to the receiver, and which is capable of determining whether the distance measurement corresponds (e.g. is equivalent) to a target distance. The system may further comprise an output device, which is communicatively connected to the processor, and which is capable of providing augmented reality information indicating one or more of the following:
  whether the distance received from the measurement device corresponds to (e.g. is equivalent to) the target distance,
  a location for the targeting object, such that when the targeting object is displaced to the indicated location the distance measurement will correspond to the target distance.

Technical Definitions

A working space may be a physical real-world environment. For example the working space may be the inside of a vehicle, such as an aircraft. More particularly, the working space may be a fuselage of an aircraft.

An augmented reality system may provide a live direct view of a working space or an indirect video view (or image) of the working space. The elements of the live direct view or the indirect video view are supplemented by computer-generated input such as sound, video, graphics and/or Global Positioning System (GPS) data. The augmented reality system may include at least one of the following: a color display, a microphone, a WiFi transmitter/receiver, a Bluetooth transmitter/receiver, a battery, speech recognition. The augmented reality system may be implemented using smart eyewear, e.g. Vuzix Smart Glasses M100.

A targeting object or calibrating object may be a real-world object (i.e. a physical entity) suitable for use with a measurement device. In particular, the calibrating object may be a physical object suitable for calibrating the measurement device. Similarly the targeting object may be a physical object suitable for use with the measurement device when measuring a distance with the measurement device. For example, the targeting/calibrating object may be a reflector, i.e. a device that causes reflection (e.g. of a beam or waves used for measuring a distance measurement), such that the measurement device may measure a distance to the calibrating/targeting object by measuring the time taken by a pulse from the measurement device to be reflected off the object and return to the measurement device. When the measurement device is a laser, the targeting object may be a pen, a sheet of paper or a hand.

The measurement device (or measuring instrument) may be capable of measuring a distance (i.e. length) to a targeting object. The measurement device may be capable of measuring distances of at least 100 meters. The measurement device may be capable of measuring at least 10 meters at 1 mm accuracy. The measurement device may be electronic. The measurement device may be capable of communicating wirelessly, e.g. via Bluetooth. The measurement device may be implemented as an electronic distance meter, an ultrasonic ranging module, a radar or a laser (e.g. a laser distance measuring device or laser rangefinder). Accordingly, when the measurement device is implemented as a laser, the measurement device may function by sending a laser pulse toward an object (e.g. the targeting object or the calibrating object) and measuring the time taken by a pulse to be reflected off the object and return to the measurement device. For example, the measurement device may be implemented as the Leica Disto D3a BT laser.

An attachment area may be located within the working space. The attachment area may be a region suitable for holding at least one point of attachment. The attachment area may be fixed or fastened to the working space. The attachment area may include at least one point of attachment, e.g. a plurality of points of attachment. Multiple distinct attachment areas may be located within the working space. The attachment area may be implemented as a rail (i.e. a seating rail or retention rail) mounted or fixed to the fuselage of an aircraft.

A point of attachment may be located on an attachment area. The point of attachment may be part of the attachment area (e.g. a slot or a hole in the attachment area). The point of attachment may be a means suitable for fixing or fastening an object to the attachment area in the working space. The object (e.g. a seat) may be attached (i.e. fixedly mounted or connected) to the point of attachment. The object may be attached to multiple points of attachment.

The subject matter described in this application can be implemented as a method or on a device, possibly in the form of one or more computer program products. The subject matter described in the application can be implemented in a data signal or on a machine readable medium, where the medium is embodied in one or more information carriers, such as a CD-ROM, a DVD-ROM, a semiconductor memory, or a hard disk. Such computer program products may cause a data processing apparatus to perform one or more operations described in the application.

In addition, subject matter described in the application can be implemented as a system including a processor, and a memory coupled to the processor. The memory may encode one or more programs to cause the processor to perform one or more of the methods described in the application. Further subject matter described in the application can be implemented using various machines.

Details of one or more implementations are set forth in the exemplary drawings and description below. Other features will be apparent from the description, the drawings, and from the claims.

BRIEF DESCRIPTION OF THE FIGURES

FIG. 8 depicts a model that can be viewed using the augmented reality system and manipulated using the smart glove.

DETAILED DESCRIPTION

In the following text, a detailed description of examples will be given with reference to the drawings. It should be understood that various modifications to the examples may be made. In particular, one or more elements of one example may be combined and used in other examples to form new examples.

Figure 1:
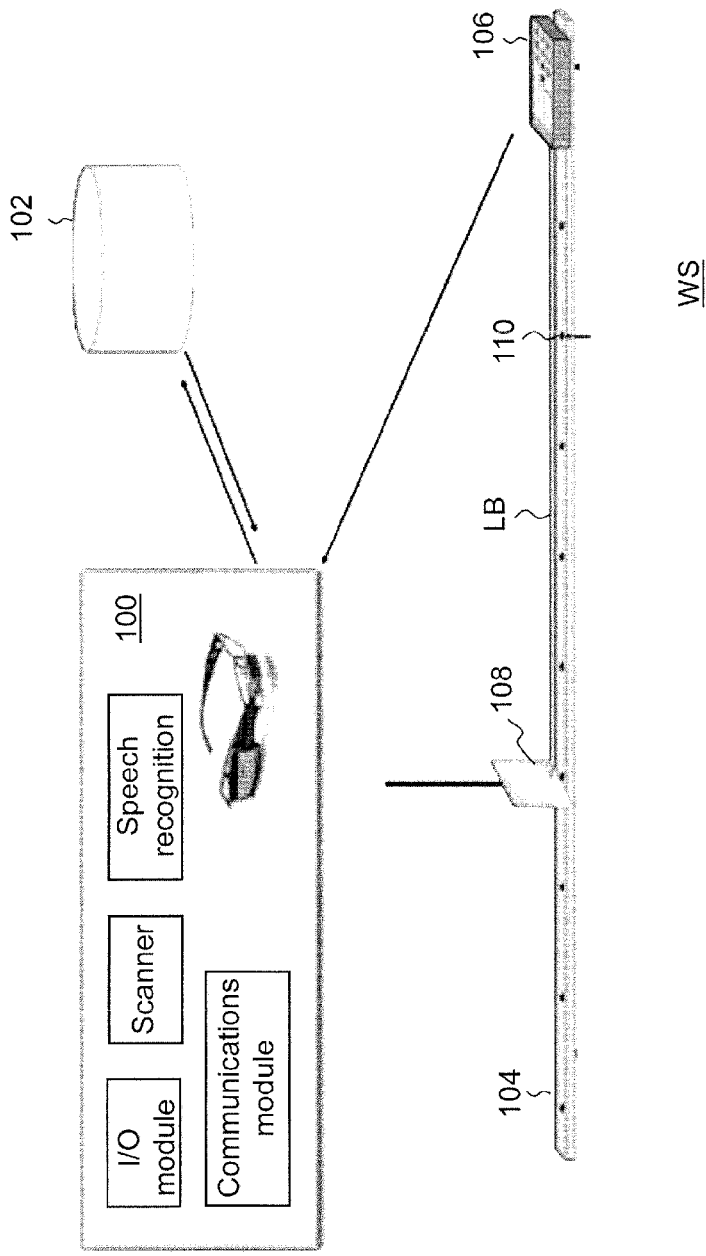
FIG. 1 depicts components used in an assembling method.

FIG. 1 depicts components that can be used in an assembling method. The assembling method of the present application might not include all of the components depicted. Although many examples below relate to measuring and/or manufacturing in the context of an aircraft, the following teaching could be applied to a variety of other measuring and/or manufacturing scenarios in which a number of objects need to be placed/mounted at various points of attachment within a working space. For example, the teaching could be applied in the context of a passenger ship, a train, an automotive vehicle such as a bus and/or an amusement park.

In particular, an augmented reality system 100 is shown as a pair of smart glasses. Smart glasses (also referred to as smart glass or Digital Eye Glasses or Personal Imaging System) refer to a system comprising a wearable computer that adds information onto reality or images thereof or actually helps people see better. Typically this is achieved through an optical head-mounted display (OHMD) or computerized internet-connected glasses with transparent heads-up display (HUD) or augmented reality (AR) overlay that has the capability of reflecting projected digital images as well as allowing the user to see through it, or see better with it. Some embodiments of smart glasses are hands-free and particularly can communicate with the user and/or the Internet and/or external applications (e.g. on a server) via natural language voice commands, while other (at least partly) use input devices such as touch buttons. The augmented reality system 100 according to the present embodiment may include a receiver, a processor, an input device and an output device. The input device may be a scanner capable of scanning operation numbers listed as machine readable codes 204 (e.g. bar codes, matrix codes, Quick Response (QR) codes or the like) in a work order 202 (see FIG. 2). Thus, the machine readable codes 204 are an example of input received by the input device.

An operation number may be used to load locations of points of attachment from a database 102. In particular, an operation number may relate to or provide information on an attachment area 104 (e.g. a rail or rail system where a seat is to be arranged within a working space WS such as a fuselage of an aircraft) and the database 102 may be accessed to obtain target distances for specified (predetermined or predeterminable) points of attachment on the attachment area 104. The work order 202 may include a plurality of operation numbers, each corresponding to a different attachment area. The attachment area 104 may be a rail in the working space. The augmented reality system 100 may communicate wirelessly (e.g. via WiFi) with the database 102 in order to load the locations of the points of attachment.

Each attachment area may be located in a working space WS. A fuselage of an aircraft is an example of a working space WS. When the working space WS is the fuselage of an aircraft, the operation number may be used to load seat configuration measurements (i.e. target distances for points of attachment for seats) from the database 102.

A measurement device 106 may be placed or arranged in the working space WS. In addition a targeting object 108 may be provided in the working space WS. In FIG. 1, the measurement device 106 is shown as a laser rangefinder comprising a laser. The laser rangefinder is a measurement device which uses a laser beam LB to determine or detect the distance to an object. The most common form of laser rangefinder operates on the time of flight principle by sending at least one laser pulse (particularly in a narrow or focused beam) from a sender towards the targeting object 108 and measuring the time taken by the pulse to be reflected off the targeting object 108 and returned to the sender. The laser rangefinder may be a commercially available device. Other types of measurement devices (possibly based on radar measurement, Doppler-measurement, etc.) may be used according to the present disclosure. The reflector is depicted as having a rectangular shape, however, any other shapes suitable for a distance measurement may also be used. Further, other types of targeting object 108 may be used.

A reference point 110 may be located in the working space WS. The reference point 110 may be a datum marker (i.e. a reference datum) located on the attachment area 104. In particular, the reference point 110 may be a sticker or tag adhered or fixed to the attachment area 104 at a specified (predetermined or predeterminable) position.

Accordingly, the measurement device 106 may measure a distance measurement (i.e. a length) from the measurement device 106 to the targeting object 108. The measurement device 106 may (particularly wirelessly) directly or indirectly transmit the distance measurement (or information relating thereto) to the augmented reality system 100. The augmented reality system 100 may receive the distance measurement (or the information relating thereto) from the measurement device 106. The augmented reality system 100 may determine or calculate a target distance, e.g. based on a specified (predetermined or predeterminable) positional relationship to the reference point 110.

The augmented reality system 100 may use the distance measurement provided by the measurement device 106 to determine whether a mark should be made at or near the location of the targeting object 108 or a different location. The mark may indicate a point of attachment in the working space WS, e.g. a point of attachment for a seat on a rail 104 in the fuselage of the aircraft. The targeting object 108 may also be used to validate whether marks have been made at the locations specified in the work order 202.

The augmented reality system 100 may output (e.g. display or show) instructions to the user e.g. via the smart glasses 100. In particular, when the augmented reality system 100 determines that the distance measured by the measurement device 106 does not correspond to (e.g. is not equivalent or equal to) a target distance, the augmented reality system 100 may output (e.g. show or display) an indication to the user of where to place the targeting object 108, such that when the targeting object 108 is placed or relocated according to the indication, such that the distance measured by the measurement device 106 will correspond (e.g. be equivalent or equal) to the target distance.

The user may check the result (e.g. the indication) provided by the augmented reality system 100. The augmented reality system 100 may include a microphone and voice recognition capability. The user may audibly interact with the augmented reality system 100 to issue and/or receive instructions to and from the augmented reality system 100.

Figure 2:
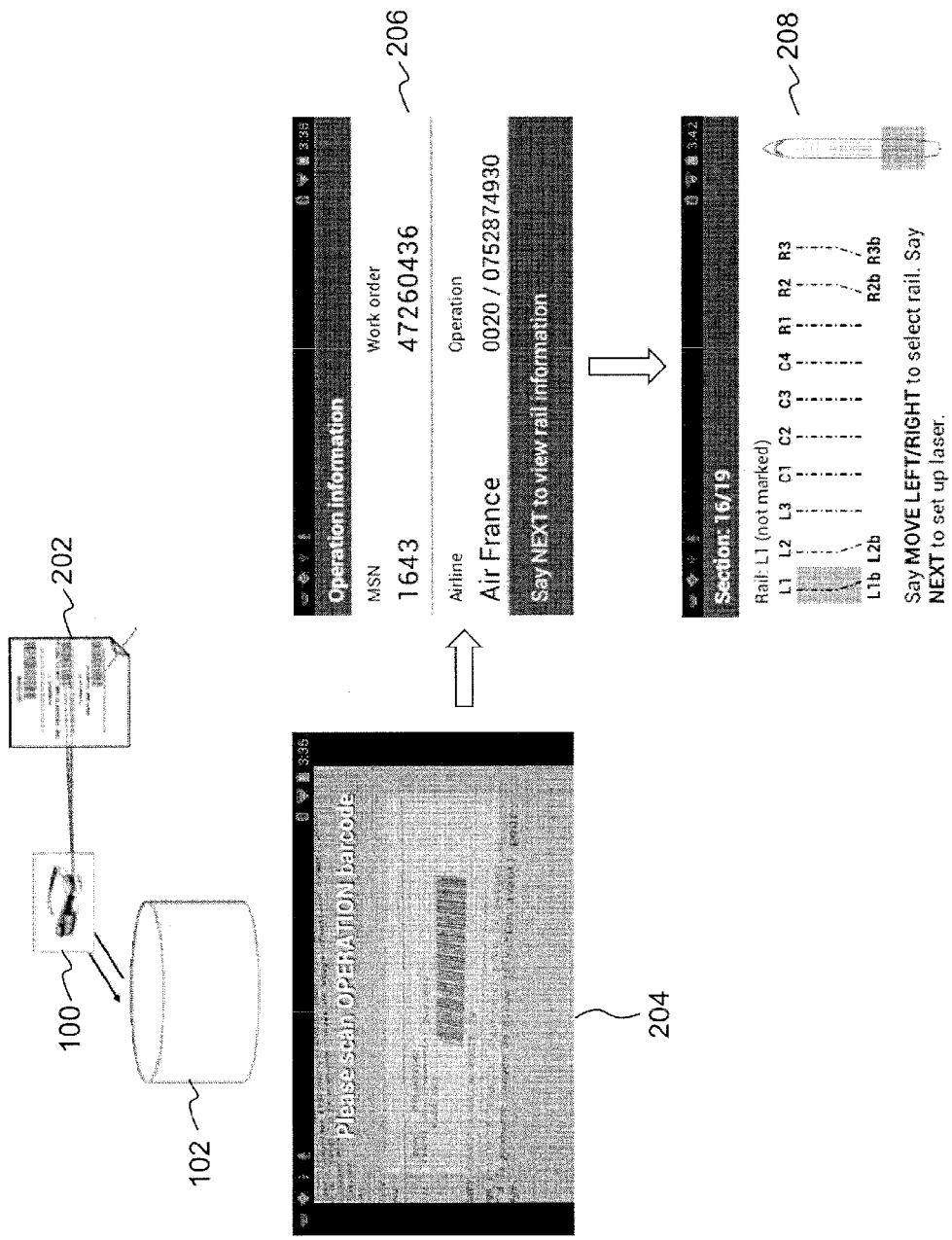
FIG. 2 shows receipt of input at an input device of an augmented reality system.

FIG. 2 shows receipt of input at an input device of the augmented reality system 100.

The input may be provided on a work order 202. Work orders 202 (also referred to as job order, job ticket or work ticket, as it often has some type of ticket attached) is an order received by an organization (such as an aircraft manufacturer) from a customer or client, or an order created internally within the organization, wherein a work order may be for products or services. Specifically, in a manufacturing environment, a work order contains information about the manufacture, building and/or engineering of the products e.g. as requested by the customer.

Usually, a work order 202 is an internal document used by projects-based, manufacturing, building and fabrication businesses and may relate to products and/or services. In a manufacturing environment, a work order 202 often is used to signal the start of a manufacturing process and will most probably be linked to a bill of material. Hence, the work order 202 will often include information on at least one of the following: (a) the quantity of the product to be manufactured, built or fabricated; (b) the amount of raw material to be used; (c) the types of operation(s) required; (d) a machine utilisation for each machine during the routing process. In a service environment, the work order 202 records the location, date and time the service or operation (s) is/are to be carried out and the nature of service that is to be (or was) carried out. In particular, the input may be implemented as the machine readable code(s) 204 provided on the work order 202.

Augmented reality system 100 may prompt the user to retrieve the information on the work order 202 e.g. by scanning one or more of the machine readable codes. Accordingly, a machine readable code provided as input may be used to determine operation information 206, e.g. by wirelessly querying the database 102 using the machine readable code. The operation information 206 may specify a manufacturer serial number, an airline and a work order number.

The operation information 206 may be output (e.g. displayed) to the user, who may verify that the operation information 206 is correct and corresponds to the appropriate operation. The user may then validate the result by an appropriate input (such as a voice command) to the augmented reality system 100.

After reviewing the operation information 206, the user may (e.g. audibly) interact with the augmented reality system 100 in order to obtain (particularly view) attachment area information 208. The augmented reality system 100 may display to the user suitable commands available ("Say NEXT to view rail information" as shown in the example) to the user in view of performing such operation. The attachment area information 208 may show a plurality of attachment areas (e.g. all of the attachment areas such as rails L1, L2, L3, C1; C2, C3, R1, R2, R3 within the fuselage of the aircraft) in the working space WS. Each attachment area in the attachment area information 208 may include at least one point of attachment. In particular, the attachment area information 208 may display rails including attachment points for seats in the fuselage of the aircraft. The attachment area information 208 may show a section of the aircraft and a particular attachment area (e.g. the attachment area 104) may be selected. The augmented reality may display to the user suitable commands available ("Say MOVE LEFT/ RIGHT to select rail. Say next to setup laser." as shown in the example) to the user in view of performing such operation.

The terms "point of attachment" and "attachment point" are used interchangeably.

Figure 3:
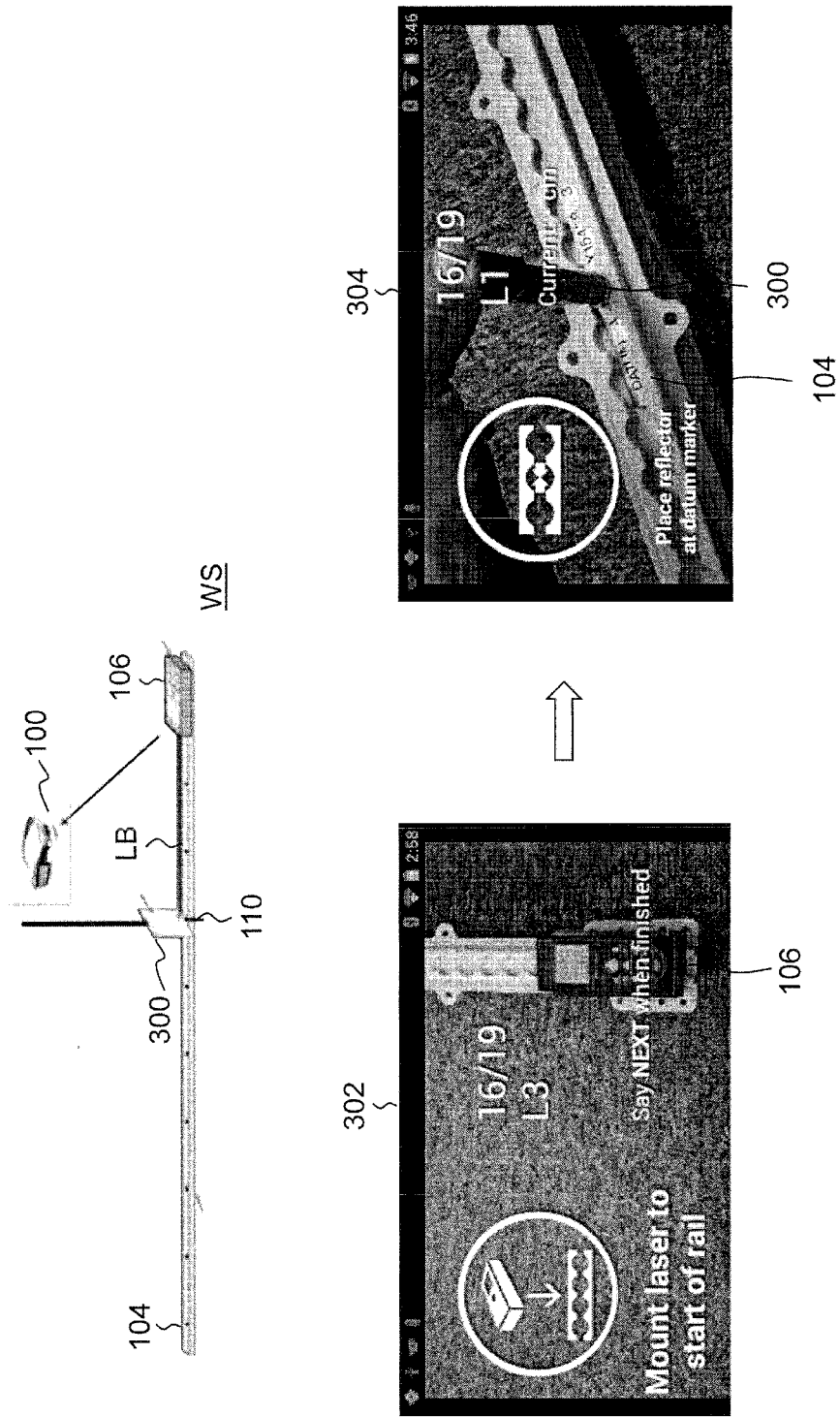
FIG. 3 shows calibration of a measurement device via a calibrating object.

Once the attachment area 104 is selected, the augmented reality system 100 may prompt the user to arrange the measurement device 106 in the working space and calibrate the measurement device 106, e.g. via a calibrating object 300 (see FIG. 3). Advantageously, by calibrating the measurement device 106 via the calibrating object 300, it is not necessary to place the measurement device 106 in a precise location within the working space. In other words, the measurement device 106 may be placed within a certain distance from an end of the selected attachment area 104 (e.g. between the end of the selected attachment area 104 and the reference point 110) rather than precisely on the end of the selected attachment area 104.

As an alternative to calibration, the measurement device 106 may be placed a specified (predetermined or predeterminable) distance from the reference point 110 according to a specified (predetermined or predeterminable) positional relationship between the measurement device 106 and the reference point 110. In this respect, it should be understood that the measurement device 106 may be positioned at a specified location (e.g. a specified position on the attachment area 104 such as the rail), so that the system is already aware of a spatial relation of the measurement device 106 to the attachment area 104. Alternatively, the measurement device 106 may be placed at an arbitrary position within the working space WS (e.g. a position aligned with the attachment area 104 and between an end of the attachment area 104 and the reference point 110) and the spatial relationship (particularly the distance and/or orientation) of the measurement device 106 to the attachment area 104 may be determined e.g. by a calibration process.

FIG. 3 shows calibration of the measurement device 106 via the calibrating object 300.

The targeting object 108 and the calibrating object 300 may be the same, e.g. both objects may be implemented using the same reflector.

In order to perform calibration of the measurement device 106, the measurement device 106 may be placed in the working space WS. The augmented reality system 100 may instruct the user by outputting a suitable instruction (e.g. "Mount laser to start of rail") to place the measurement device 106 at a specified position such as at an end (e.g. at the start) of the selected attachment area 104 (e.g. rail), e.g. as shown at a view 302. The augmented reality system 100 may instruct the user by outputting a suitable instruction (e.g. "16/19 L3" standing for rail L3 in the area of rows 16/19 in the fuselage) on the selected attachment area 104 indicating where the measurement device 106 should be placed. For example, the augmented reality system 100 may instruct the user by outputting a suitable instruction to mount the measurement device 106 at the start of the rail. The augmented reality system 100 may provide a visual display of mounting the measurement device 106, as shown at the view 302. Once the user has carried out the instruction, he may confirm the completion to the augmented reality system 100, wherein the augmented reality system 100 may indicate to the user available option(s) and/or command(s) in this respect (e.g. "Say NEXT when finished" in the example shown).

Thus, the measurement device 106 may be placed within a predetermined distance of an end of the selected attachment area 104. The measurement device 106 may be aligned with an end of the selected attachment area 104 and the reference point 110. The measurement device 106 may be placed between an end of the selected attachment area 104 and the reference point 110.

The augmented reality system 100 may instruct the user by outputting a suitable instruction (e.g. "Place reflector at datum marker") to place the calibrating object 300 at the reference point 110. The augmented reality system may provide the user with a visual indication of placing the calibrating object 300 at the reference point 110, e.g. as shown at a view 304. Accordingly, the user may place the calibrating object 300 over the reference point 110 on the attachment area 104, e.g. as shown at a view 304. The user may then confirm placement of the measurement device 106 and/or the calibrating object 300 to the augmented reality system 100, e.g. via an (particularly audible) indication to the augmented reality system 100.

The views 302 and 304 may be (partial) views from the augmented reality system 100.

The measurement device 106 may determine a calibration distance from the measurement device 106 to the calibrating object 300. Assuming that the calibrating object 300 has been placed on the reference point 110, the calibration distance corresponds to (e.g. is equivalent to) the distance between the measurement device 106 and the reference point 110. Accordingly, the augmented reality system 100 may then determine the specified (predetermined or predeterminable) positional relationship between the measurement device 106 and the working space WS and/or the attachment area 104 based on the calibration distance. In particular, the specified positional relationship may be equal to the calibration distance.

Figure 4:
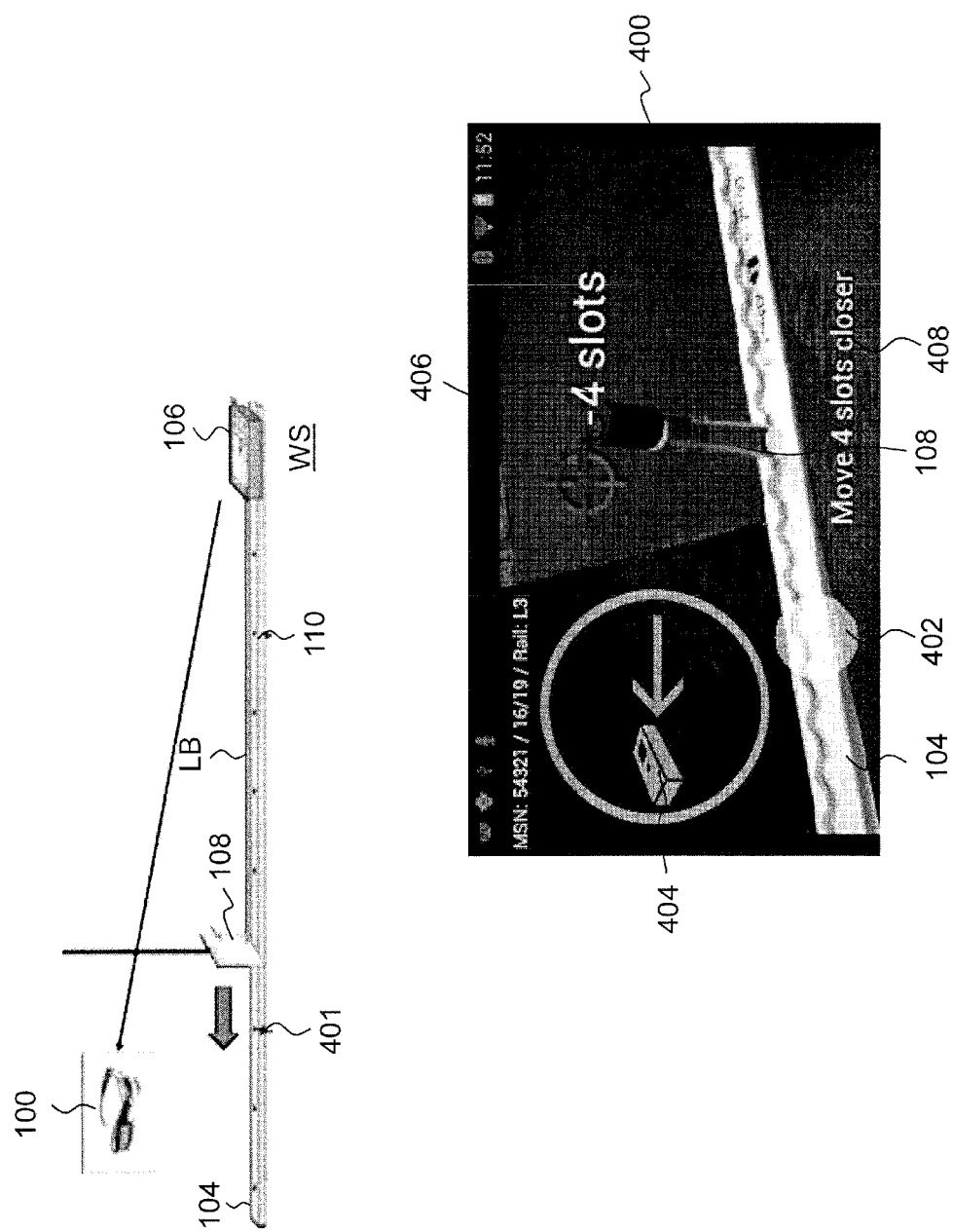
FIG. 4 depicts the showing of an indication on the augmented reality system of where to place a targeting object.

FIG. 4 depicts the showing of an indication 402 on the augmented reality system 100 of where to place the targeting object 108. The targeting object 108 is shown as a square reflector (top) and as a pen-shaped reflector red, blue and black in color (bottom).

The indication 402 may be shown when the augmented reality system 100 determines that the distance measurement measured by the measurement device 106 does not correspond to (e.g. is not equivalent or equal to) the target distance. The indication 404 may be shown after the targeting object 108 has been provided in the working space WS and the distance measurement by the measuring device 106 has been measured and transmitted to the augmented reality system 100.

A distance between a target location 401 (e.g. target hole on the rail) and the measurement device 106 may correspond to the target distance. In particular, the distance between the target location 401 and the measurement device 106 may be equal to the target distance. The target location 401 may also be referred to as a target position.

In the present application, according to an example, a determination of whether the distance measurement measured by the measurement device 106 does or does not correspond to the target distance may be implemented by determining whether the distance measurement measured by the measurement device 106 is or is not equivalent (or equal) to the target distance.

Thus, the augmented reality system 100 may indicate whether the distance measurement corresponds to the target distance by indicating or outputting that the distance measurement does not correspond to the target distance.

Accordingly, a number of indications may be shown in a view 400. The view 400 may be a (partial) view from the augmented reality system 100. The view 400 may include the indication 402 of where to place the targeting object 108, such that after the targeting object 108 is placed according to the indication 402, a distance measured by the measurement device 106 to the targeting object 108 will correspond to the target distance. The indication 402 may be implemented by a graphic or icon generated by the augmented reality system and overlaid on the physical real world view of the attachment area 104. The indication 402 may be overlaid on a point of attachment on the attachment area 104, wherein a distance between the point of attachment and the measurement device 106 is or corresponds to the target distance. The indication 402 particularly may be implemented as a filled circle have a color distinguishable from a color of the attachment area 104 (e.g. the filled circle is blue and the attachment area is beige in the example shown).

The position of the indication 402 may be calculated using image recognition. In particular, the augmented reality system 100 may calculate the difference between the target distance and the distance measurement. The augmented reality system 100 may recognize the targeting object 108 and the points of attachment between the targeting object 108 and the target location 401, e.g. via image recognition. Accordingly, using the calculated difference and the image recognition of the points of attachment, the augmented reality system 100 may calculate the number of points of attachment between the targeting object 108 and the target location 401.

The view 400 may also include an indication 404 of a direction (i.e. an indicated direction) to move the targeting object 108, such that after the targeting object is moved in the indicated direction, a distance measured by the measurement device 106 to the targeting object 108 will be closer to the target distance. It should be understood that if the targeting object is moved too far in the indicated direction, a distance measured by the measurement device 106 to the targeting object 108 will be further away from the target distance. Advantageously, the indication 402 and an indication 406 may prevent this from occurring.

The view 400 may also include the indication 406. The indication 406 may include the difference between the distance measurement and the target distance. The indication 406 may also indicate that the distance measurement does not correspond to the target distance and/or give a corresponding instruction to the user. The difference indicated in the indication 406 may be specified as a number of points of attachment (e.g. slots) between the distance measurement and the target distance. For example, "−4 slots" in the indication 406 may indicate that the distance measurement is 4 slots greater than the target distance and that the targeting object 108 should be moved 4 slots closer to the measurement device 106. There may be included an indication 408 including natural language instructions to the user in the view 400 (e.g. "Move 4 slots closer" in the example shown).

In some cases, a point of attachment may be implemented as a slot or hole in the attachment area 104.

Figure 5:
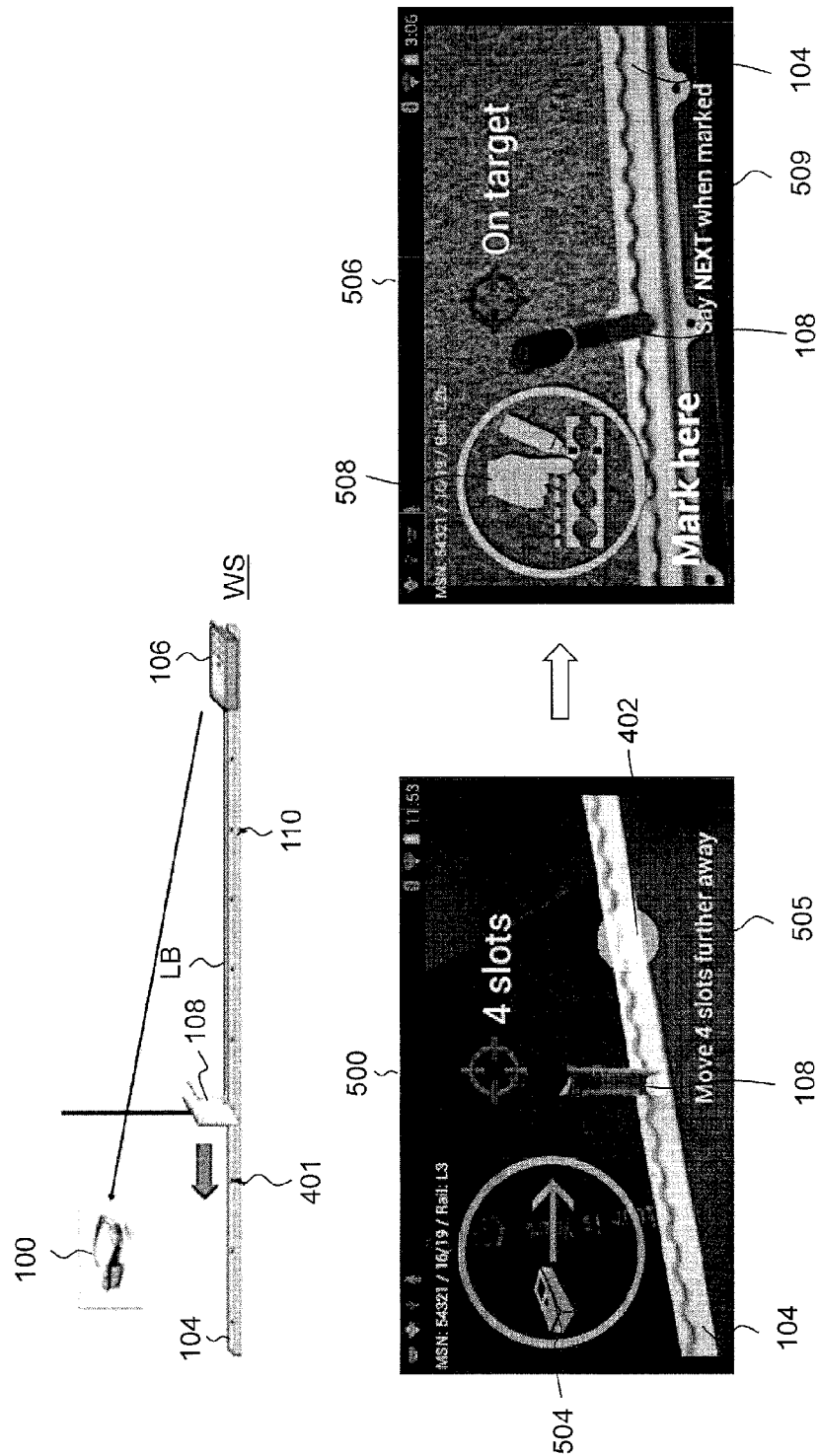
FIG. 5 depicts the showing of an indication on the augmented reality system of where to place the targeting object and the showing of an indication on the augmented reality system of a location at which a mark should be made.

FIG. 5 depicts the showing of an indication 502 on the augmented reality system 100 of where to place the targeting object 108 and the showing of an indication on the augmented reality system 100 of the target location 401 at which a mark should be made. The target location 401 may be the location of a point of attachment on the selected attachment area 104.

A view 500 may show a number of indications, particularly the indication 502.

The view 500 may be a (partial) view from the augmented reality system 100. After the targeting object 108 is placed according to the indication 502, a distance measured by the measurement device 106 to the targeting object 108 will correspond to the target distance.

The view 500 may also show an indication 504. The indication 504 may indicate a direction to move or displace the targeting object 108, such that after the targeting object 108 is moved in the indicated direction, a distance measured by the measurement device 106 will be closer to the target distance. The augmented reality system 100 may also specify (or output to the user) a number of points of attachment as well as a direction to move the targeting object 108. For example, if the difference between the target distance and the distance measurement is a distance equal to four points of attachment (i.e. the target distance is greater than the distance measurement by a distance spanned by four points of attachment), the augmented reality system 100 indicates that the user should move the targeting object 108 four points of attachment further away from the measurement device 106. There may be included an indication 505 including natural language instructions to the user in the view 500 (e.g. "Move 4 slots further away" in the example shown).

As discussed in the context of FIG. 4, it should be understood that if the targeting object 108 is moved too far in the indicated direction, the distance measured by the measurement device 106 to the targeting object 108 will be further away from the target distance. Advantageously, the indication 502 may help the user to prevent this from occurring.

As depicted in the example of FIG. 5, the attachment area 104 is a rail and the points of attachment are slots provided in the rail.

A view 506 also shows indications or instructions to the user. The view 506 may be a (partial) view from the augmented reality system 100. In particular, the view 506 shows an indication or instruction on the of the target location 401 at which a mark should be made. The view 506 may be displayed when the augmented reality system 100 determines that the distance measurement corresponds to the target distance. Accordingly, the view 506 may indicate the target location 401, i.e. a location in the working space WS (e.g. on the attachment area 104), at which a mark indicating a point of attachment should be made. The view 506 may include a visual indication or icon 508 specifying an operation the user should perform e.g. to mark the attachment area and where the mark should be made in relation to the targeting object 108. Thus, the mark indicates a point of attachment on the attachment area 104. There may be included an indication 509 including natural language instructions to the user in the view 506 (e.g. "Mark here" in the example shown).

The augmented reality system 100 may prompt the user to make an audible indication (e.g. say the word "next") after the mark indicating the point of attachment has been made. The mark may be made by the user via a felt tip pen.

Figure 6:
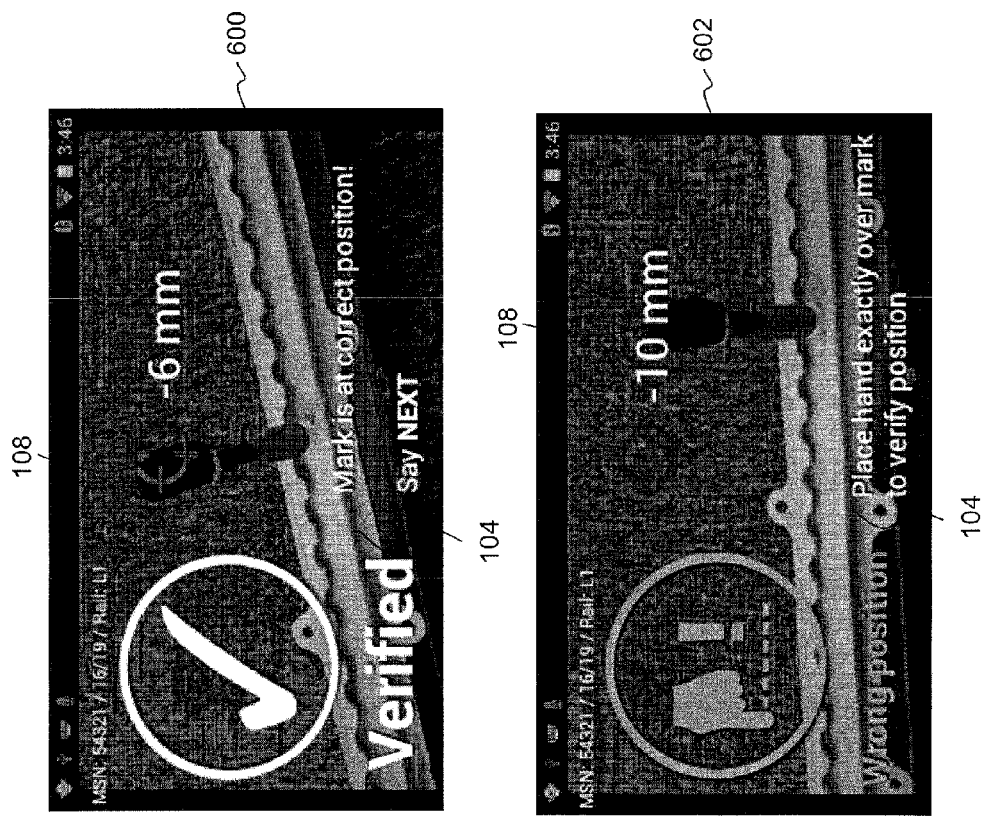
FIG. 6 depicts validation of a mark using the measurement device and the augmented reality system.

FIG. 6 depicts validation of the mark using the measurement device 106 and the augmented reality system 100.

The validation of the mark may take place after the mark (physically) has been made, according to the indication 508, and the targeting object 108 particularly has been removed. The purpose of the validation of the mark on the rail is to ensure that the mark was made at the target location 401. Validation may involve providing the targeting object 108 at the location of the mark, i.e. the location where the mark was made. Accordingly, the measurement device 106 may measure a distance measurement from the measurement device 106 to the targeting object 108. The distance measurement may be transmitted to the augmented reality system 100 and the augmented reality system 100 may validate whether the distance measurement corresponds to the target distance. In particular, the augmented reality system 100 may validate whether the distance measurement is equivalent to the target distance.

A view 600 shows an indication of a result based on the validation. The view 600 may be a (partial) view from the augmented reality system 100. In the view 600, the location of the mark is the same as the target location 401, i.e. the distance measurement corresponds to the target distance. Thus, the mark is at the correct position.

A view 602 also shows an indication of a result based on the validation. The view 602 may be a (partial) view from the augmented reality system 100. In the context of the view 602, the distance measurement does not correspond to the target distance, i.e. the location of the mark is not the same as the target location 401.

In the view 602, the augmented reality system 100 may also provide an indication of where to place the mark (e.g. a direction toward or away from the measurement device 106 and/or a location) so that the mark will be at the target location 401.

Figure 7:
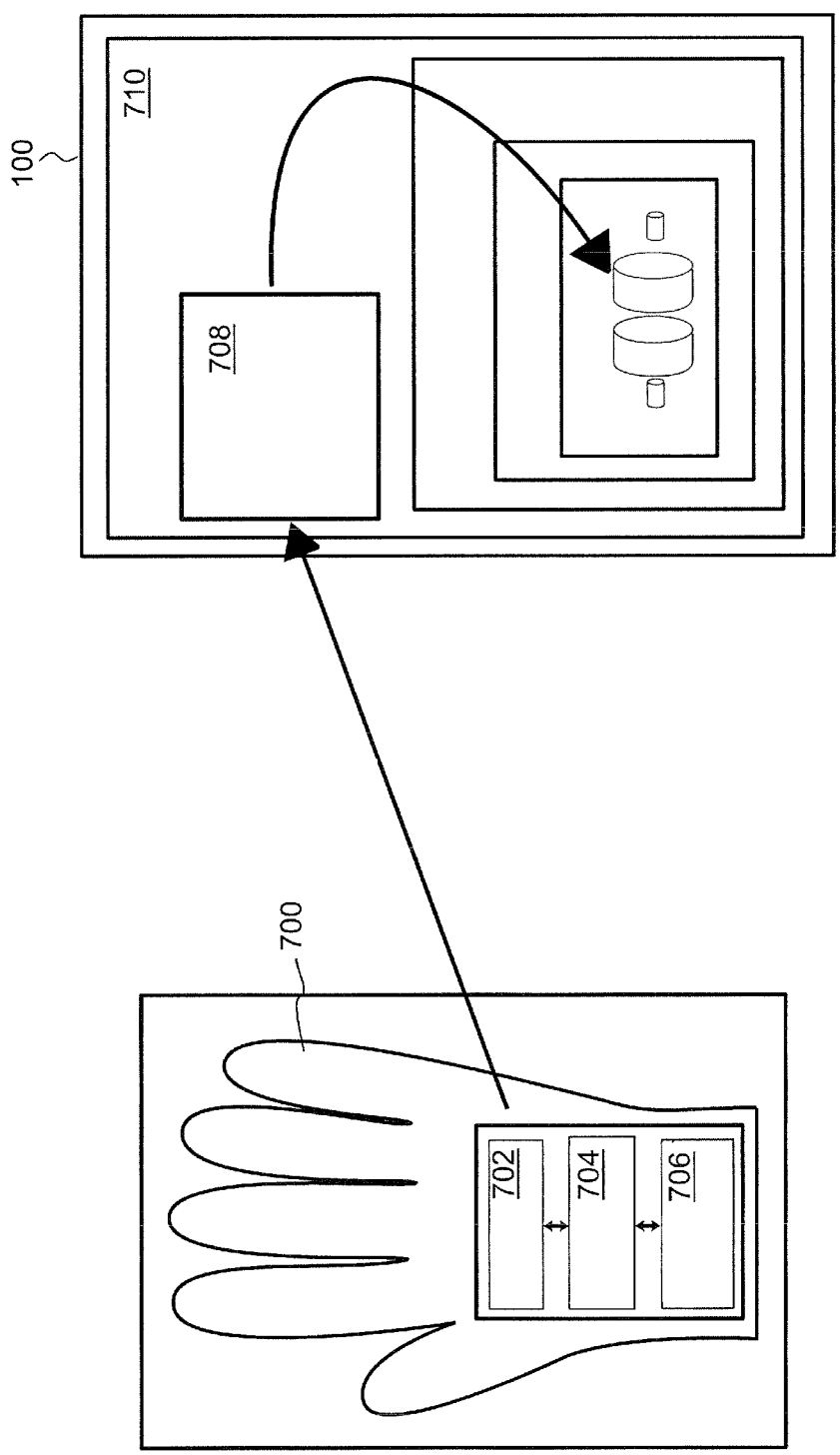
FIG. 7 depicts a smart glove for use in conjunction with the augmented reality system.

FIG. 7 depicts a smart glove 700 particularly for use in conjunction with the augmented reality system 100. The augmented reality system 100 is depicted in a functional block diagram. The smart glove 700 may also be referred to as a wired glove, a dataglove or a cyberglove.

The augmented reality system 100 can be used to see a virtual 3D model of an object, e.g. an aircraft part. The smart glove 700 may be worn by the user and may be capable of communicating with the augmented reality system 100. When the user moves the glove 700, the augmented reality system 100 enables the user to virtually manipulate the orientation/rotation of the virtual 3D model of the object as it is displayed to the user in the augmented reality system 100. The user can disable the glove-controlled manipulation of the virtual 3D model of the object and simply handle the real world object.

The smart glove 700 may include a wireless radio 702, e.g. a Bluetooth radio, a microcontroller 704 and/or a gyroscope acceleration sensor 706. The components 702, 704 and 706 may be communicatively connected particularly to each other. Rotation data from the smart glove 700 may be sent to a rotation controller 708 of the augmented reality system 100. The rotation controller 708 may be part of a custom Android application 710.

In conjunction with the augmented reality system 100, the smart glove 700 may enable 3D virtual objects to be displayed and/or manipulated. Various parts of the aircraft or an engine of the aircraft, e.g. a piston or a valve, may be displayed as 3D virtual objects. Accordingly, the user can view a virtual aircraft while inside a physical aircraft.

It should be understood that the smart glove 700 may be used in conjunction with the augmented reality assembling method and system described above to allow the user to interact with the augmented reality system 100. However, the smart glove 700 may be used in conjunction with other systems and methods of augmented reality, as appropriate.

According to an aspect, an object manipulation system may comprise the augmented reality system 100 and the smart glove 700. The rotation controller 708 may be configured to receive feedback regarding the location of the smart glove 700. The augmented reality system 100 may be configured to display a virtual 3D object. The rotation controller 708 may be configured to detect interaction between the smart glove 700 and the virtual 3D object displayed by the augmented reality system 100. The Android application 710 may be configured to rotate the virtual 3D object in response to the detected interaction. The augmented reality system 100 may be configured to display the rotated virtual 3D object.

FIG. 8 depicts a virtual 3D model that can be viewed using the augmented reality system 100 and manipulated using the smart glove 700.

An initial model 800 is shown, after have been exploded into its component parts. A partly rotated model 802 is shown, after a part of the initial model 800 has been rotated using the smart glove 700.

Figure 9:
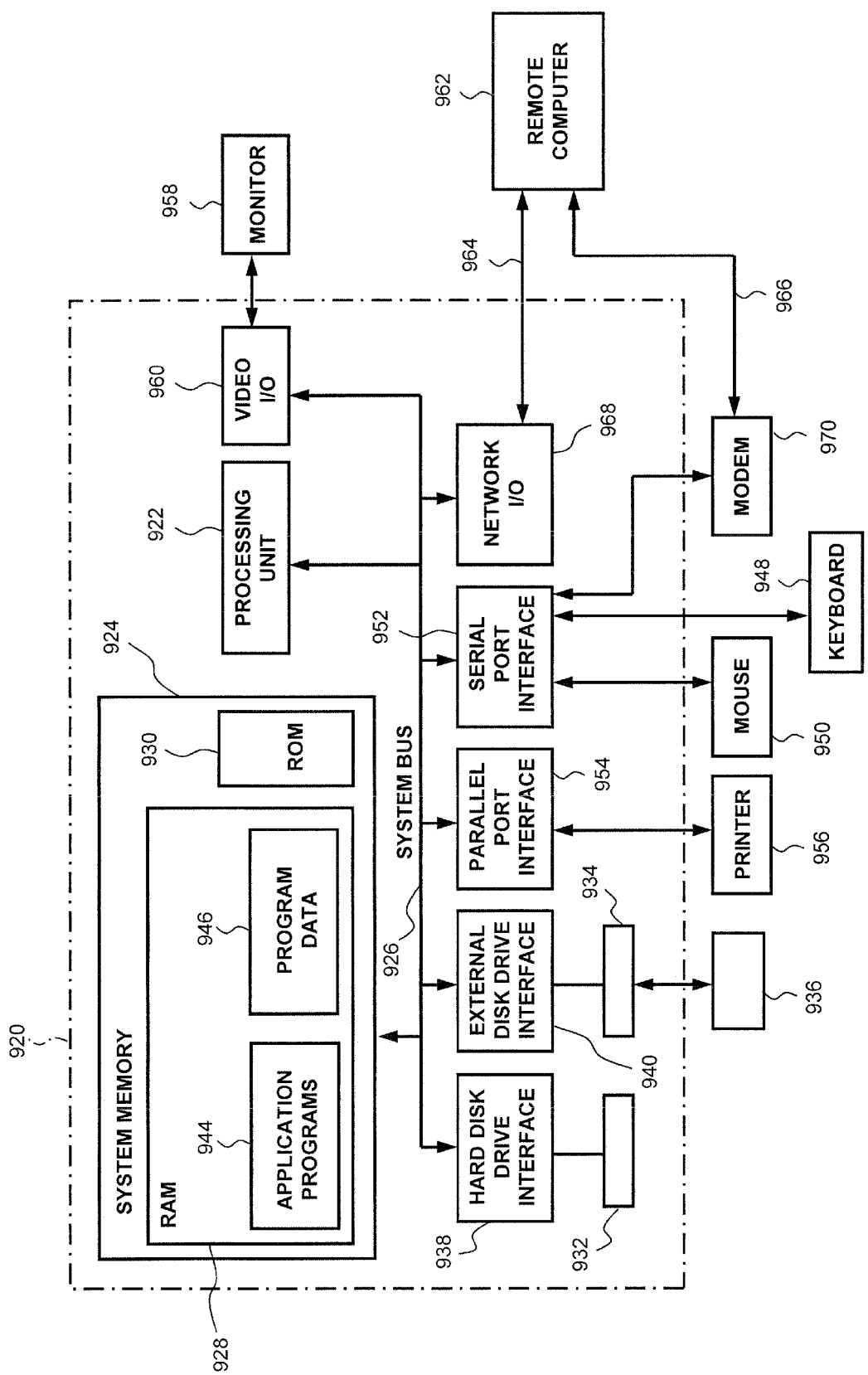
FIG. 9 depicts a general purpose computer system that can be used to implement aspects of the described subject matter.

FIG. 9 shows an exemplary system for implementing the claimed subject matter including a general purpose computing device in the form of a conventional computing environment 920 (e.g. a personal computer). The conventional computing environment includes a processing unit 922, a system memory 924, and a system bus 926. The system bus couples various system components including the system memory 924 to the processing unit 922. The processing unit 922 may perform arithmetic, logic and/or control operations by accessing the system memory 924. The system memory 924 may store information and/or instructions for use in combination with the processing unit 922. The system memory 924 may include volatile and non-volatile memory, such as a random access memory (RAM) 928 and a read only memory (ROM) 930. A basic input/output system (BIOS) containing the basic routines that helps to transfer information between elements within the personal computer 920, such as during start-up, may be stored in the ROM 930. The system bus 926 may be any of several types of bus structures including a memory bus or memory controller, a peripheral bus, and a local bus using any of a variety of bus architectures.

The personal computer 920 may further include a hard disk drive 932 for reading from and writing to a hard disk (not shown), and an external disk drive 934 for reading from or writing to a removable disk 936. The removable disk may be a magnetic disk for a magnetic disk driver or an optical disk such as a CD ROM for an optical disk drive. The hard disk drive 932 and the external disk drive 934 are connected to the system bus 926 by a hard disk drive interface 938 and an external disk drive interface 940, respectively. The drives and their associated computer-readable media provide non-volatile storage of computer readable instructions, data structures, program modules and other data for the personal computer 920. The data structures may include relevant data for the implementation of the assembling method for measuring and/or manufacturing, as described above. The relevant data may be organized in a database, for example a relational or object database.

Although the exemplary environment described herein employs a hard disk (not shown) and an external disk 936, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 936, ROM 930 or RAM 928, including an operating system (not shown), one or more application programs 944, other program modules (not shown), and program data 946. The application programs may include at least a part of the functionality as depicted in FIGS. 1 to 8 and described in the corresponding text of the description.

A user may enter commands and information, as discussed below, into the personal computer 920 through input devices such as keyboard 948 and mouse 950. Other input devices (not shown) may include a microphone (or other sensors), joystick, game pad, scanner, or the like. These and other input devices may be connected to the processing unit 922 through a serial port interface 952 that is coupled to the system bus 926, or may be collected by other interfaces, such as a parallel port interface 954, game port or a universal serial bus (USB). Further, information may be printed using printer 956. The printer 956, and other parallel input/output devices may be connected to the processing unit 922 through parallel port interface 954. A monitor 958 or other type of display device is also connected to the system bus 926 via an interface, such as a video input/output 960. In addition to the monitor, computing environment 920 may include other peripheral output devices (not shown), such as speakers or other audible output.

The computing environment 920 may communicate with other electronic devices such as a computer, telephone (wired or wireless), personal digital assistant, television, or the like. To communicate, the computer environment 920 may operate in a networked environment using connections to one or more electronic devices. FIG. 9 depicts the computer environment networked with remote computer 962. The remote computer 962 may be another computing environment such as a server, a router, a network PC, a peer device or other common network node, and may include many or all of the elements described above relative to the computing environment 920. The logical connections depicted in FIG. 9 include a local area network (LAN) 964 and a wide area network (WAN) 966. Such networking environments are commonplace in offices, enterprise-wide computer networks, intranets and the Internet and may particularly be encrypted.

When used in a LAN networking environment, the computing environment 920 may be connected to the LAN 964 through a network I/O 968. When used in a WAN networking environment, the computing environment 920 may include a modem 970 or other means for establishing communications over the WAN 966. The modem 970, which may be internal or external to computing environment 920, is connected to the system bus 926 via the serial port interface 952. In a networked environment, program modules depicted relative to the computing environment 920, or portions thereof, may be stored in a remote memory storage device resident on or accessible to remote computer 962. Furthermore other data relevant to the assembling method for measuring and/or manufacturing (described above) may be resident on or accessible via the remote computer 962. It will be appreciated that the network connections shown are exemplary and other means of establishing a communications link between the electronic devices may be used.

The above-described computing system is only one example of the type of computing system that may be used to implement the assembling method for measuring and/or manufacturing.

The invention claimed is:

1. An assembling method, comprising:
positioning a measurement device in a working space such that the measurement device has a specified positional relationship to a reference point in the working space;
determining a position as a determined position of a targeting object in the working space, wherein the determining comprises measuring, by the measurement device, a distance measurement from the measurement device to the targeting object;
transmitting, by the measurement device, the distance measurement to a processor;
determining, by the processor, whether the distance measurement corresponds to a target distance;
determining, by the processor, whether the determined position of the targeting object corresponds to a target position;
outputting information on a display device, the information including at least one of sound, video, graphics, and global positioning system data, wherein the outputted information includes:
whether the distance measurement corresponds to the target distance;
a location in the working space for the targeting object, such that in response to the targeting object being displaced to the outputted location, a determined position of the targeting object corresponds to the target position and the distance measurement corresponds to the target distance; and
an instruction to a user; and
receiving input at an input device, the input including a confirmation of execution of the instruction by the user.

2. The assembling method of claim 1, wherein the measuring of the distance measurement from the measurement device to the targeting object includes measuring a distance of at least 10 meters with at least millimeter accuracy.

3. The assembling method of claim 1, wherein the transmitting by the measurement device is carried out wirelessly.

4. The assembling method of claim 1, wherein the working space an aircraft fuselage.

5. The assembling method of claim 1, wherein the working space includes at least one attachment area comprising a plurality of points of attachment, and wherein the reference point is located on the attachment area.

6. The assembling method of claim 1, wherein when the specified positional relationship is not predetermined, and wherein the positioning of the measurement device in the working space comprises:
placing a calibrating object in the working space at the reference point;
determining, by the calibrating object, a calibration distance from the measurement device to the reference point; and
determining the specified positional relationship based on the calibration distance.

7. The assembling method of claim 1, further comprising:
displaying, via the display device, an indication of points in the working space for at least one of:
where the measurement device should be mounted;
where a calibrating object should be placed; and
where the targeting object should be placed;

wherein each indication of points is overlaid on the working space and/or an image of the working space.

8. The assembling method of claim 7, wherein the targeting object and the calibrating object are a same object having a predetermined color, and wherein the predetermined color is distinguishable from a color of the working space and/or an image of the working space.

9. The assembling method of claim 1, wherein the specified positional relationship is predetermined, and positioning the measurement device in the working space further comprises:
   placing the measurement device a specified distance from the reference point_according to the predetermined specified positional relationship.

10. The assembling method of claim 1, wherein the method further comprising:
   determining the target distance based on the input.

11. The assembling method of claim 1, wherein, in response to a determination that the distance measurement does not correspond to the target distance, the method further comprises at least one of displaying on the display device:
   at least one indication of where to place the targeting object, such that after the targeting object is placed according to the indication, a distance measured by the measurement device to the targeting object corresponds to the target distance;
   at least one indication of a direction to move the targeting object such that after the targeting object is moved in the indicated direction, a distance measured by the measurement device to the targeting object is closer to the target distance; and
   an indication of the difference between the distance measurement and the target distance;
   wherein each indication is overlaid on the working space and/or an image of the working space.

12. The method of claim 1, wherein, in response to determining that the distance measurement corresponds to the target distance, the method further comprises:
   indicating a location in the working space indicating a point of attachment on an attachment area in the working space; and
   making a mark at the indicated location and removing the targeting object.

13. The method of claim 12, further comprising:
   positioning the targeting object at a location of the mark;
   measuring, by the measurement device, a distance measurement from the measurement device to the targeting object;
   validating whether the distance measurement corresponds to the target distance; and
   outputting a result based on the validation.

14. A non-transitory computer program product comprising computer-readable instructions, which, when loaded and executed on a computer system, cause the computer system to perform operations comprising:
   position a measurement device in a working space such that the measurement device has a specified positional relationship to a reference point in the working space;
   determine a position as a determined position of a targeting object in the working space, including measuring, by the measurement device, a distance measurement from the measurement device to the targeting object;
   transmit, by the measurement device, the distance measurement to a processor: determine, by the processor, whether the distance measurement corresponds to a target distance;
   determine, by the processor, whether the determined position of the targeting object corresponds to a target position;
   output information on a display device, the information including at least one of sound, video, graphics, and global positioning system data, wherein the outputted information includes:
      whether the distance measurement corresponds to the target distance;
      a location in the working space for the targeting object, such that in response to the targeting object being displaced to the outputted location, a determined position of the targeting object corresponds to the target position and the distance measurement corresponds to the target distance; and
      an instruction to a user; and
   receive input at an input device, the input including a confirmation of execution of the instruction by the user.

15. A manufacturing system, comprising:
   a receiver to receive a distance measurement from a measurement device located in a working space, wherein the measurement device has a specified positional relationship to a reference point in the working space, and wherein the distance measurement is a distance from the measurement device to a targeting object located in the working space;
   position determination logic for determining a position as a determined position of the targeting object provided in the working space;
   a processor communicatively connected to the receiver, the processor to:
   determine whether the distance measurement corresponds to a target distance; and
   determine whether the determined position of the targeting object corresponds to a target position; and
   an output device to output information, the information including at least one of sound, video, graphics, and global positioning system data, the information including:
   whether the distance received from the measurement device corresponds to the target distance;
   a location for the targeting object, such that when the targeting object is displaced to the outputted location the determined position will correspond to the target position and the distance measurement will correspond to the target distance; and
   an instruction to a user; and
   an input device, the input including a confirmation of execution of the instruction by the user.

* * * * *

UNITED STATES PATENT AND TRADEMARK OFFICE
CERTIFICATE OF CORRECTION

PATENT NO. : 9,870,645 B2  
APPLICATION NO. : 15/170716  
DATED : January 16, 2018  
INVENTOR(S) : Manuel Montaigne et al.

Page 1 of 1

It is certified that error appears in the above-identified patent and that said Letters Patent is hereby corrected as shown below:

On the Title Page

At Item (30), Foreign Application Priority Data "15290157" should be "15290157.5".

Signed and Sealed this  
Seventeenth Day of July, 2018

Andrei Iancu  
*Director of the United States Patent and Trademark Office*